(12) United States Patent
Hirata et al.

(10) Patent No.: US 11,371,787 B2
(45) Date of Patent: Jun. 28, 2022

(54) GAS COOLER

(71) Applicant: KOBELCO COMPRESSORS CORPORATION, Tokyo (JP)

(72) Inventors: Kazuya Hirata, Hyogo (JP); Koji Hagihara, Hyogo (JP)

(73) Assignee: KOBELCO COMPRESSORS CORPORATION, Tokyo (JP)

( * ) Notice: Subject to any disclaimer, the term of this patent is extended or adjusted under 35 U.S.C. 154(b) by 86 days.

(21) Appl. No.: 16/060,095

(22) PCT Filed: Nov. 21, 2016

(86) PCT No.: PCT/JP2016/084506
§ 371 (c)(1),
(2) Date: Jun. 7, 2018

(87) PCT Pub. No.: WO2017/110346
PCT Pub. Date: Jun. 29, 2017

(65) Prior Publication Data
US 2018/0363992 A1 Dec. 20, 2018

(30) Foreign Application Priority Data

Dec. 25, 2015 (JP) .............................. JP2015-254998

(51) Int. Cl.
*F28F 17/00* (2006.01)
*F28D 7/16* (2006.01)
(Continued)

(52) U.S. Cl.
CPC .............. *F28F 17/005* (2013.01); *F28D 7/16* (2013.01); *F28F 1/30* (2013.01); *F28F 17/00* (2013.01);
(Continued)

(58) Field of Classification Search
CPC .. F28F 17/005; F28F 1/30; F28F 17/00; F28F 2265/06; F28F 2265/22; F28D 7/16;
(Continued)

(56) References Cited

U.S. PATENT DOCUMENTS 2,552,416 A * 5/1951 Farkas .................. F28D 7/1638
165/84
3,690,606 A * 9/1972 Pall ......................... B01D 39/12
428/605
(Continued)

FOREIGN PATENT DOCUMENTS

EP 2 365 269 A1 9/2011
JP S51-041841 U 3/1976
(Continued)

OTHER PUBLICATIONS

International Preliminary Report on Patentability issued in corresponding International Application No. PCT/JP2016/084506; dated Jul. 5, 2018.
(Continued)

*Primary Examiner* — Ana M Vazquez
(74) *Attorney, Agent, or Firm* — Studebaker & Brackett PC

(57) ABSTRACT

A gas cooler effectively prevents or suppresses an outflow of drain water to the outside. The gas cooler includes a casing, a cooling unit, a seal plate, a lead-in port, a lead-out port, and a drain scattering prevention member. The cooling unit is accommodated within the casing and cools gas. The seal plate is provided in the cooling unit and partitions an inside of the casing into an upper space thorough which the gas before passing through the cooling unit flows and a bottom space through which the gas after passing through the cooling unit flows. The gas is led from the lead-in port into the upper space, and the gas is led out of the bottom space via the lead-out port. The drain scattering prevention mem-
(Continued)

ber is disposed in the bottom space, and collects the drain water, while allowing the gas to pass therethrough.

10 Claims, 7 Drawing Sheets

(51) Int. Cl.
  *F28F 1/30* (2006.01)
  *E03B 3/28* (2006.01)
  *F28D 21/00* (2006.01)
(52) U.S. Cl.
  CPC ........ *E03B 3/28* (2013.01); *F28D 2021/0038* (2013.01)
(58) Field of Classification Search
  CPC ................ F28D 2021/0038; E03B 3/28; F24F 2013/227; F24F 13/222
  See application file for complete search history.

(56) References Cited

U.S. PATENT DOCUMENTS

| | | | | |
|---|---|---|---|---|
| 4,548,260 A | * | 10/1985 | Stachura | F28D 7/1646 165/160 |
| 4,600,416 A | * | 7/1986 | Mann | B01D 46/12 137/244 |
| 4,765,893 A | * | 8/1988 | Kohlheb | B01D 63/103 210/315 |
| 9,453,692 B2 | * | 9/2016 | Fijas | B01D 53/265 |

FOREIGN PATENT DOCUMENTS

| | | | | |
|---|---|---|---|---|
| JP | H08-005206 A | | 1/1996 | |
| JP | 2015-200473 A | | 11/2015 | |
| TW | 2011-44736 A1 | | 12/2011 | |
| WO | WO-2004018949 A1 | * | 3/2004 | ........... H05K 5/0213 |
| WO | WO-2010128993 A1 | * | 11/2010 | ......... F28D 1/05316 |
| WO | WO-2011107841 A1 | * | 9/2011 | ............. F28F 9/005 |
| WO | 2013/039106 A1 | | 3/2013 | |
| WO | WO-2015156082 A1 | * | 10/2015 | ................ F28F 9/00 |

OTHER PUBLICATIONS

The extended European search report issued by the European Patent Office dated Jul. 19, 2019, which corresponds to European Patent Application No. 16878241.5 and is related to U.S. Appl. No. 16/060,095.

International Search Report issued in PCT/JP2016/084506; dated Jan. 31, 2017.

* cited by examiner

GAS COOLER

CROSS-REFERENCE TO RELATED APPLICATIONS

This is a national phase application in the United States of International Patent Application No. PCT/JP2016/084506 with an international filing date of Nov. 21, 2016, which claims priority of Japanese Patent Application No. 2015-254998 filed on Dec. 25, 2015 the contents of which are incorporated herein by reference.

TECHNICAL FIELD

The present invention relates to a gas cooler.

BACKGROUND ART

A gas cooler for a compressor, disclosed in JP 2015-200473 A, is to cool gas by causing the gas to pass through a cooling unit from its upper side to its lower side, and includes, at its bottom, a drain recovery portion that recovers drain water produced by condensation of moisture in the gas. Above the drain recovery portion, a blowing-up prevention portion is provided in the vicinity of a lead-out port. The blowing-up prevention portion prevents blowing-up of the drain water in the vicinity of the lead-out port due to a gas flow and thereby also prevents the outflow of the drain water to the outside accompanied by the gas.

SUMMARY OT THE INVENTION

Problems to be Solved by the Invention

When the flow rate of compressed gas led into the gas cooler increases, making its flow speed higher, the gas flow blown on the bottom of the gas cooler scatters the drain water before the gas reaches the blowing-up prevention portion, so that the scattered drain water might flow out to the outside accompanied by the gas.

It is an object of the present invention, in a gas cooler, to effectively prevent or suppress the outflow of drain water to the outside in a gas cooler.

Means for Solving the Problems

The present invention provide a gas cooler comprising: a casing; a cooling unit provided within the casing and configured to cool gas; an upper space located above the cooling unit and a bottom space located below the cooling unit, the upper space and the lower space being formed separately from each other by the cooling unit within the casing; a lead-in port for leading the gas into the upper space; a lead-out port for leading out the gas from the bottom space; and a drain scattering prevention member disposed in the bottom space and being configured to collect therein drain water accompanied by the gas as the gas passes, the drain water being produced by condensation of moisture contained in the gas by cooling with the cooling unit.

The drain scattering member collects therein drain water as the gas passes. Thus, the drain water is suppressed from being scattered by the gas flow, so that consequently the drain water can be effectively prevented or suppressed from flowing out of the lead-out port to the outside of the gas cooler, accompanied by the gas flow.

The cooling unit may include a seal plate for sealing a space between the upper space and the bottom space.

The gas cooler further includes a drain discharge port for discharging the drain water to an outside of the casing.

The drain scattering prevention member is provided to cover the lead-out port.

The scattering prevention member may be laid at a bottom wall of the casing.

For example, the drain scattering prevention member is a block body made of metal wool.

Alternatively, the drain scattering prevention member is a stacked body of metal meshes.

According to the gas cooler in the present invention, by arranging the drain scattering prevention member, the drain water can be prevented from being scattered due to the gas flow, and also can be effectively prevented or suppressed from flowing out to the outside.

DESCRIPTION OF EMBODIMENTS

Figure 1A:
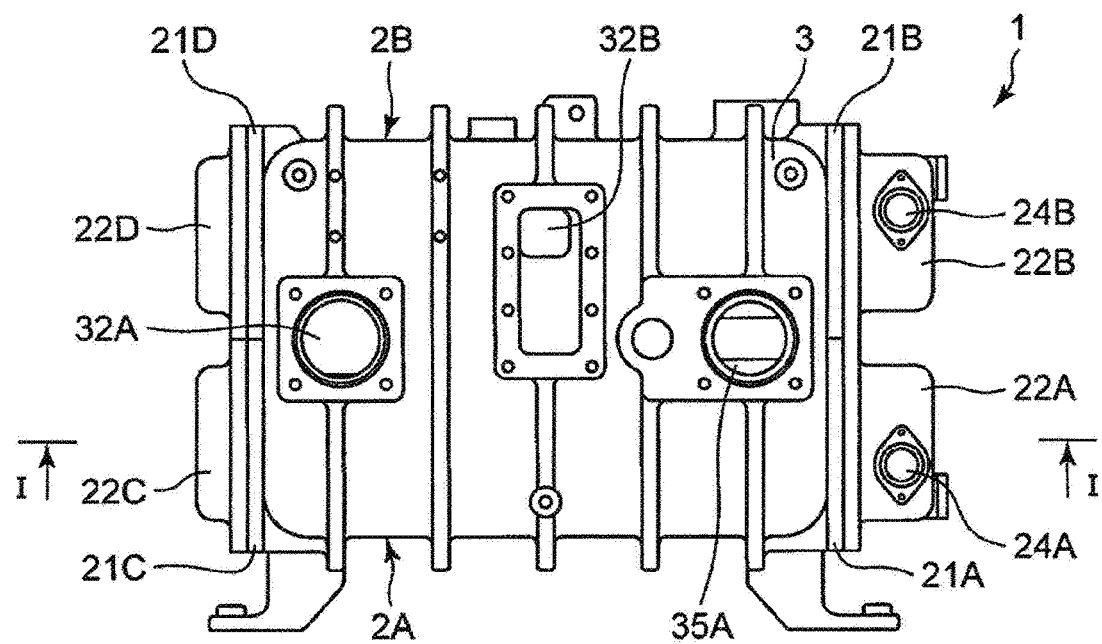
FIG. 1A is a plan view of a gas cooler according to an embodiment of the present invention.

A gas cooler 1 according to an embodiment of the present invention shown in FIGS. 1A to 1D has an intercooler 2A, an aftercooler 2B, and includes a casing 3 in which the intercooler 2A and the aftercooler 2B are integrated together. In the present embodiment, the gas cooler 1 is incorporated in an oil-free two-stage screw compressor. The intercooler 2A is provided in a gas flow path between a low-stage side screw compressor and a high-stage side screw compressor, and the aftercooler 2B is provided in a gas flow path disposed downstream of the high-stage side screw compressor.

Referring to FIGS. 2 to 5 together, the casing 3 includes a bottom wall 4, a pair of end walls 5A and 5B rising from the bottom wall 4, a pair of side walls 6A and 6B rising from the bottom wall 4, a top wall 7 located at upper ends of the end walls 5A and 5B and the side walls 6A and 6B, and a partition wall 8. The partition wall 8 separates the inside of the casing 3, that is, a space enclosed by the bottom wall 4, the end walls 5A and 5B, the side walls 6A and 6B, and the top wall 7, into a first space 11A for the intercooler 2A and a second space 11B for the aftercooler 2B. As shown most clearly in FIG. 1D, a cooling unit (heat exchanger) 13A of the intercooler 2A is accommodated in the first space 11A, whereas a cooling unit (heat exchanger) 13B of the aftercooler 2B is accommodated in the second space 11B.

Figure 6A:
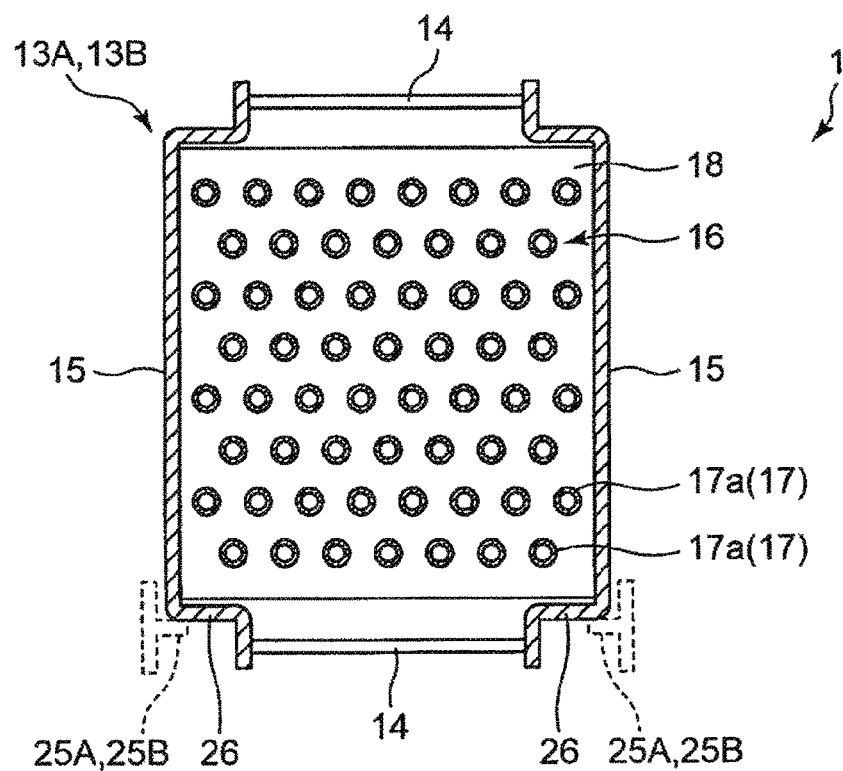
FIG. 6A is a cross-sectional view of a cooling unit.
Figure 6B:
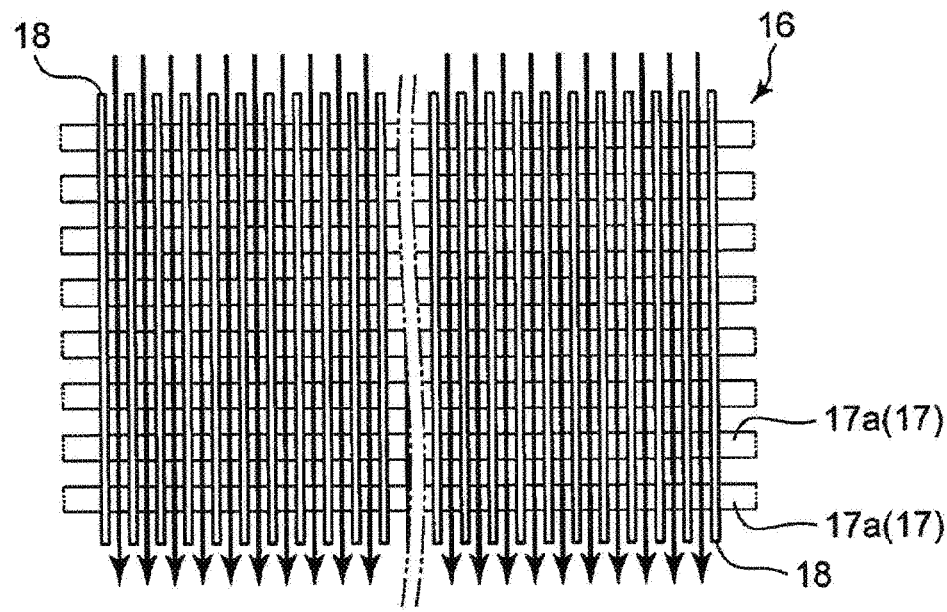
FIG. 6B is a schematic side view of the cooling unit.

Referring to FIGS. 6A and 6B, each of the cooling units 13A and 13B includes a pair of seal plates 15 and 15 coupled to spacers 14, and a tube nest 16 disposed between the seal plates 15 and 15. The tube nest 16 in the present embodiment is configured by cooling tubes 17 that have a number of linear portions 17a and a number of folded portions (not shown), each folded portion fluidly connecting the ends of two adjacent linear portions 17a. Each of the cooling units 13A and 13B includes a number of fins 18 arranged at intervals, and the linear portions 17a of the cooling tubes 17 are integrated with these fins 18.

One end wall 5A of the casing 3 is provided with an opening 19A for the cooling unit 13A of the intercooler 2A and an opening 19B for the aftercooler 2B. The other end wall 5B of the casing 3 is also provided with an opening 19C for the cooling unit 13A of the intercooler 2A as well as an opening 19D for the aftercooler 2B. The cooling unit 13A of the intercooler 2A is inserted into the openings 19A and 19C, so that the linear portions 17a of the cooling tubes 17 are arranged extending in the horizontal direction within the first space 11A. Similarly, the cooling unit 13B of the aftercooler 2B is inserted into the openings 19B and 19D, so that the linear portions 17a of the cooling tubes 17 are arranged extending in the horizontal direction within the second space 11B. The openings 19A and 19B are sealed in an airtight state by attachment portions 21A and 21B, and covers 22A and 22B are attached to the attachment portions 21A and 21B, respectively. The openings 19C and 19D are sealed in an airtight state by attachment portions 21C and 21D, and covers 22C and 22D are attached to the attachment portions 21C and 21D, respectively.

Figure 1B:
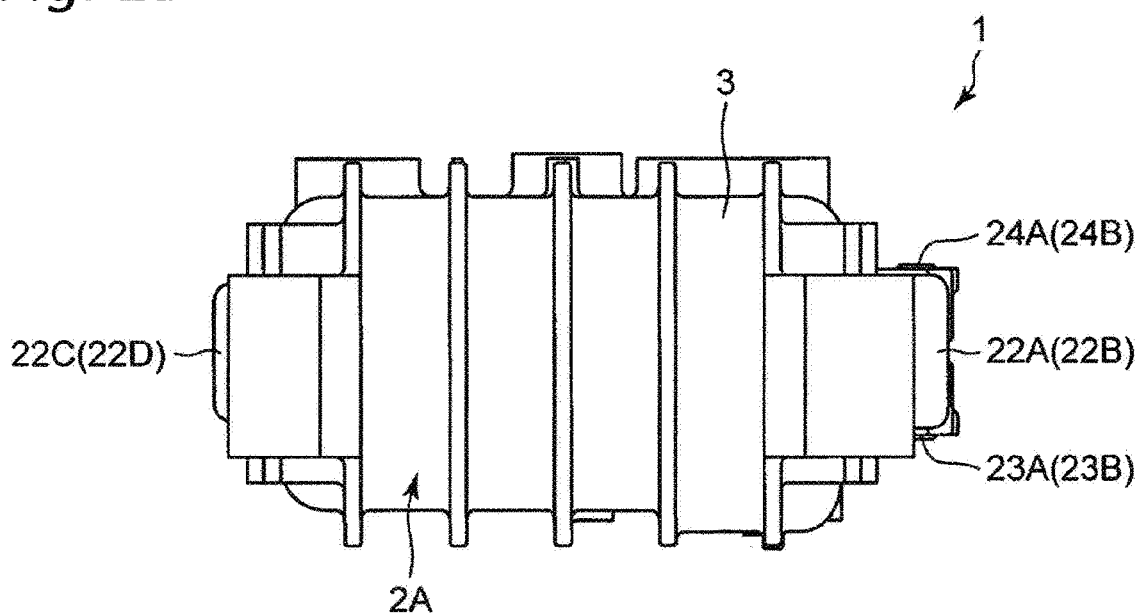
FIG. 1B is a front view of the gas cooler according to the embodiment of the present invention.

Referring to FIGS. 1A and 1B, the cooling water is supplied from an inflow port 23A provided in the cover 22A to the cooling tubes 17 of the cooling unit 13A in the intercooler 2A. Then, the cooling water having passed through the cooling tubes 17 flows out of an outflow port 24A provided in the cover 22A. The cooling water is supplied from an inflow port 23B provided in the cover 22B to the cooling tubes 17 of the cooling unit 13B in the aftercooler 2B, and the cooling water having passed through the cooling tubes 17 flows out of an outflow port 24B provided in the cover 22B.

As shown most clearly in FIGS. 3 to 6, in the first space 11A, a pair of support ribs 25A and 25A that extends between the end walls 5A and 5B is provided at the side wall 6A and the partition wall 8. On these support ribs 25A and 25A, step portions 26 (see FIG. 6A) of the seal plates 15 and 15, which are included in the cooling unit 13A of the intercooler 2A, are supported to form a seal portion. Thus, the first space 11A is partitioned into an upper space 27A located above the cooling unit 13 and a bottom space 28A located below the cooling unit 13A, between the end walls 5A and 5B. As will be mentioned later, the gas before passing through the cooling unit 13A circulates through the upper space 27A, whereas the gas after passing through the cooling unit 13A circulates through the bottom space 28A.

Similarly, in the second space 11B, step portions 26 (see FIG. 6A) of the seal plates 15 and 15, which are included in the cooling unit 13B of the aftercooler 2B, are supported on a pair of support ribs 25B and 25B extending between the end walls 5A and 5B provided in the side wall 6B and the partition wall 8, respectively, to thereby form the seal portion. Thus, the second space 11B is partitioned into an upper space 27B located above the cooling unit 13B and a bottom space 28B located below the cooling unit 13B, between the end walls 5A and 5B. As will be mentioned later, the gas before passing through the cooling unit 13B circulates through the upper space 27B, whereas the gas after passing through the cooling unit 13B circulates through the bottom space 28B.

Figure 1C:
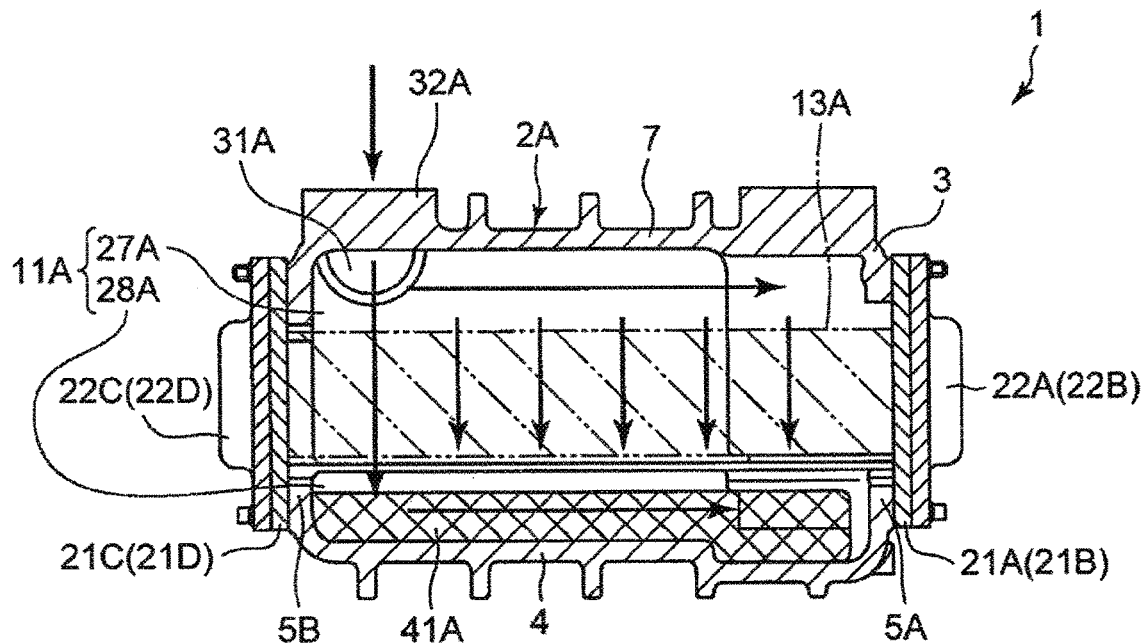
FIG. 1C is a cross-sectional view taken along the line I-I of FIG. 1A.
Figure 2:
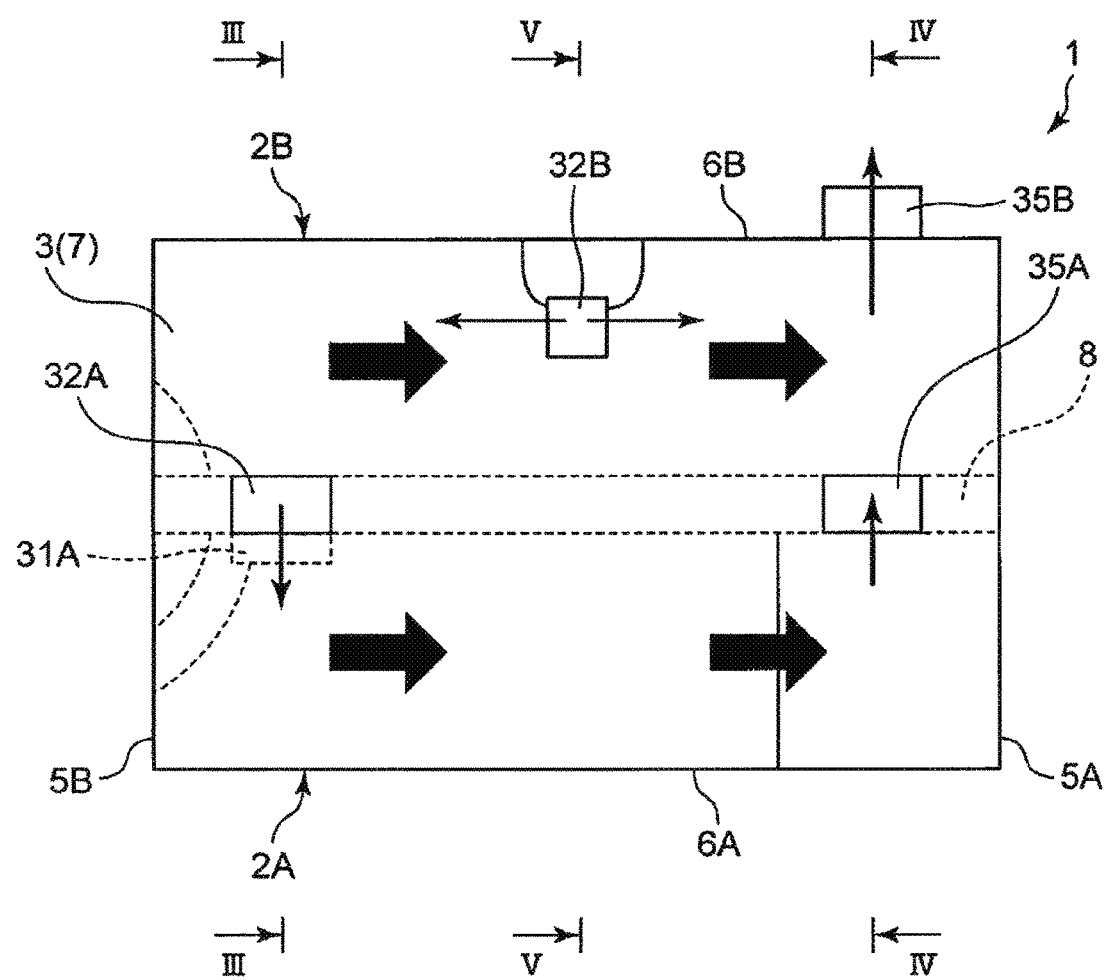
FIG. 2 is a schematic plan view of the gas cooler according to the embodiment of the present invention.
Figure 3:
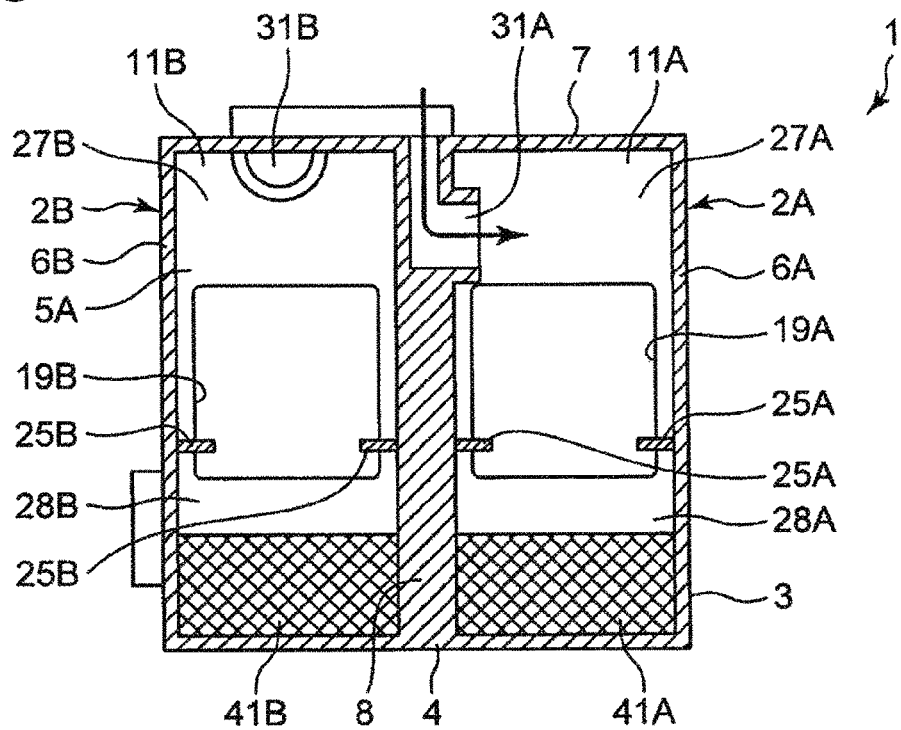
FIG. 3 is a schematic cross-sectional view taken along line of FIG. 2.

Referring to FIGS. 1C and 3, a lead-in port 31A of the intercooler 2A is provided at a position, adjacent to the end wall 5B, of the top wall 7 so as to be open at the upper space 27A in the first space 11A. A lead-in port 31A communicates with an inlet port 32A (see FIGS. 1A and 2) that is fluidly connected to a discharge port in the low-stage compressor. Further, referring to FIGS. 1C and 4, a lead-out port 33A of the intercooler 2A is provided at a position, adjacent to the end wall 5A, of the partition wall 8 so as to be open at the bottom space 28A of the first space 11A. The lead-out port 33A communicates with an outlet port 35A (see FIGS. 1A, 2, and 4) provided in the top wall 7 via a flow path 34 formed in the partition wall 8. The outlet port 35A is fluidly connected to a suction port of the high-stage compressor.

Figure 4:
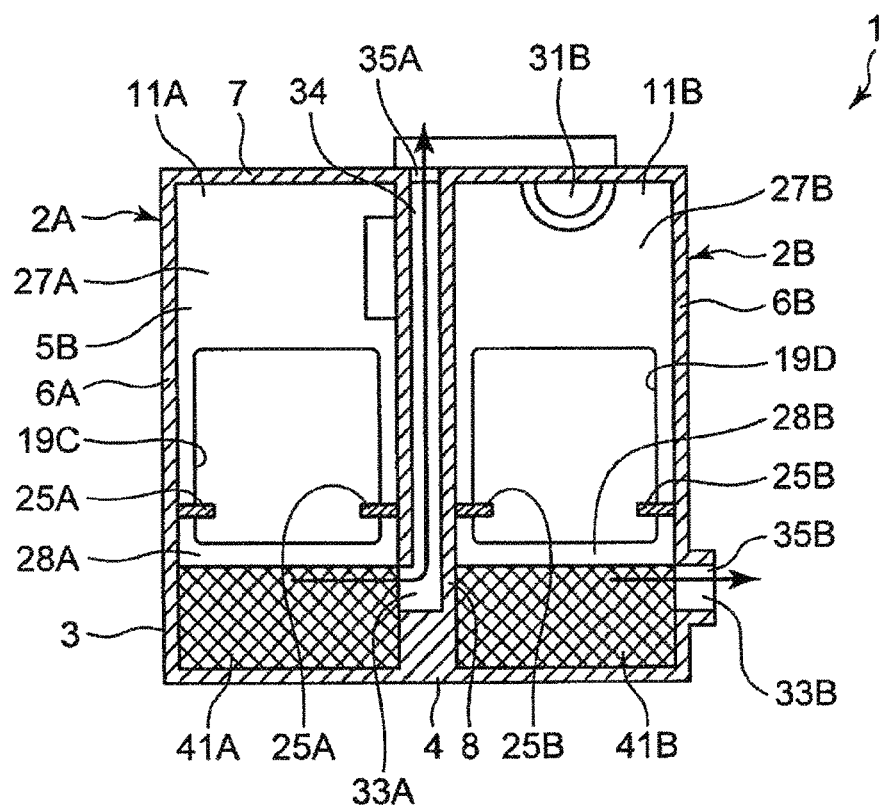
FIG. 4 is a schematic cross-sectional view taken along line IV-IV of FIG. 2.
Figure 5:
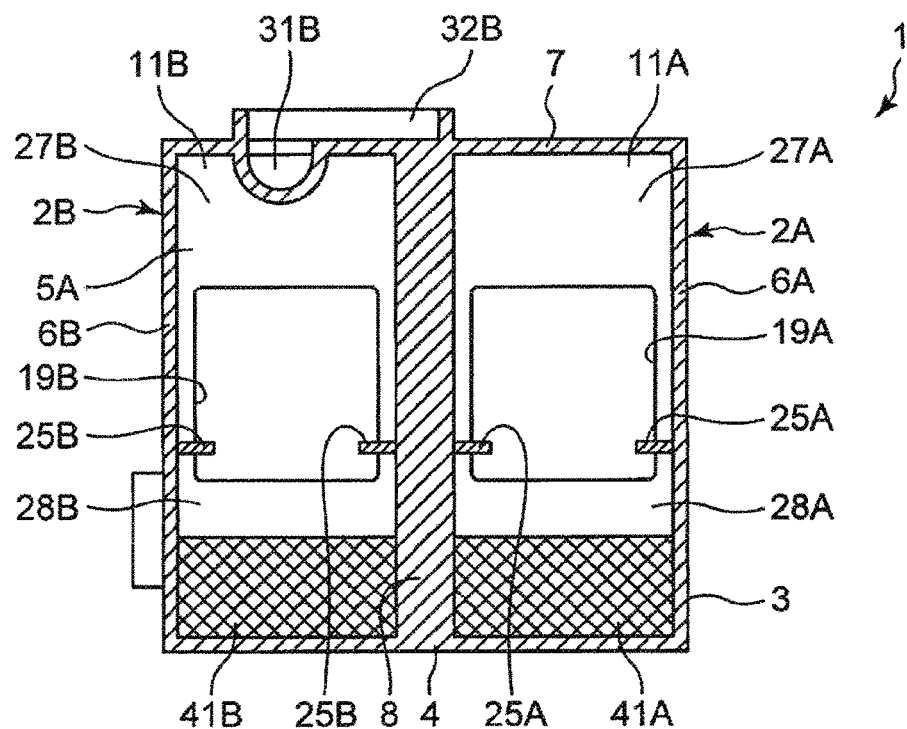
FIG. 5 is a schematic cross-sectional view taken along line V-V of FIG. 2.

Referring to FIGS. 2, 4, and 5, two lead-in ports 31B and 31B of the aftercooler 2B are provided in the vicinity of the center in the longitudinal direction of the top wall 7 so as to be open at the upper space 27B of the second space 11B. The lead-in ports 31B and 31B communicate with an inlet port 32B (see FIGS. 1A and 2) fluidly connected to the discharge port of the high-stage compressor. Referring to FIG. 4, a lead-out port 33B of the aftercooler 2B is provided at a position, adjacent to the end wall 5A, of the side wall 6B so as to be open in the bottom space 28B of the second space 11B. The lead-out port 33B is fluidly connected to the downstream side with respect to the two-stage screw compressor.

Figure 1D:
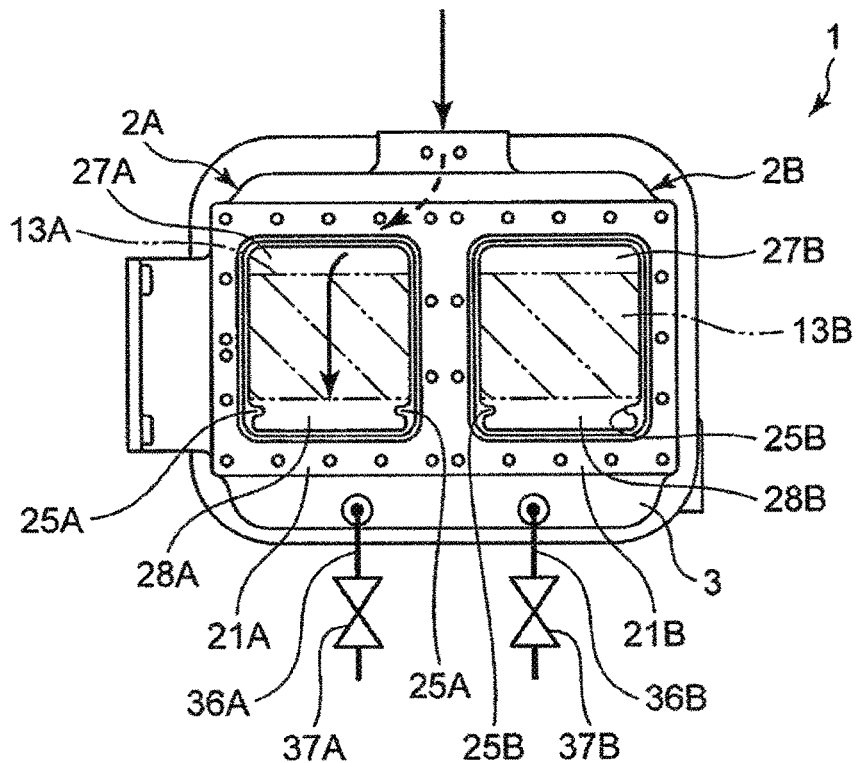
FIG. 1D is a right side view of a state in which a component as a part of the gas cooler is removed from the gas cooler in the embodiment of the present invention.

Referring to FIG. 1D, a first drain portion 36A is provided to communicate with the side of the bottom wall 4 of the first space 11A, whereby the drain water in the intercooler 2A is discharged to the outside through the first drain portion 36A. A solenoid valve 37A is provided in the first drain portion 36A. Further, a second drain portion 36B is provided to communicate with the side of the bottom wall 4 in the second space 11BB, whereby the drain water in the aftercooler 2B is discharged to the outside through the second drain portion 36B. A solenoid valve 37B is provided in the second drain portion 36B.

Referring to FIGS. 1C and 3 to 5, a drain scattering prevention member 41A is laid on the bottom wall 4 in the first space 11A for the intercooler 2A. In the present embodiment, the drain scattering prevention member 41A is laid over the entire first space 11A along the longitudinal direction in the planar view. In other words, the drain scattering prevention member 41A is laid from the end wall 5A to the end wall 5B. The drain scattering prevention member 41A is laid over the entire first space 11A along the width direction in the planar view. In other words, the drain scattering prevention member 41A is laid from the side wall 6A to the partition wall 8. Further, the drain scattering prevention member 41A has a constant height and a flat upper surface. Referring to FIG. 4, the height of the drain scattering prevention member 41A is set higher than the height of an upper end of the lead-out port 33A. In other words, the drain scattering prevention member 41A is provided to cover the lead-out port 33A.

Referring to FIGS. 1C and 3 to 5, a drain scattering prevention member 41B is also laid on the bottom wall 4 in the second space 11B for the aftercooler 2B. In the present embodiment, the drain scattering prevention member 41B is laid over the entire second space 11B along the longitudinal direction in the planar view. The drain scattering prevention member 41B is laid over the entire second space 11B along the width direction in the planar view. Further, the drain scattering prevention member 41B has a constant height and a flat upper surface. Referring to FIG. 4, the height of the drain scattering prevention member 41B is set higher than the height of an upper end of the lead-out port 33B. In other words, the drain scattering prevention member 41B is provided to cover the lead-out port 33B.

The drain scattering prevention members 41A and 41B have a structure that collects the drain water, while allowing the gas to pass therethrough. The materials constituting the drain scattering prevention members 41A and 41B preferably have appropriate heat resistance. Furthermore, the materials constituting the drain scattering prevention members 41A and 41B preferably have appropriate corrosion resistance. Each of the drain scattering prevention members 41A and 41B in the present embodiment is a block body made of stainless steel wool, which is an example of a block body of metal wool, and has appropriate heat resistance and corrosion resistance. Each of the drain scattering prevention members 41A and 41B is not limited to the block body of metal wool and may be an integrated body of metal meshes.

The gas (compressed air) discharged from a discharge port of the low-stage compressor is led from the lead-in port 31A into the upper space 27A of the intercooler 2A via the inlet port 32A. As conceptually indicated by the arrows in FIG. 1C, the gas passes through the cooling unit 13A from its upper side to its lower side while spreading within the upper space 27A in the longitudinal direction. Referring also to FIG. 4, the gas flowing into the bottom space 28A after having passed through the cooling unit 13A flows from the lead-out port 33A to the flow path 34 and is led out of the outlet port 35A. In this way, in the intercooler 2A, the gas is led in from the upper space 27A, i.e., from its upper side, and the gas is then led out of the bottom space 28A, i.e., from its lower side. The gas led out of the intercooler 2A is drawn into the suction port of the high-stage compressor.

Referring to FIG. 6B, the gas sent to the cooling unit 13A moves from the side of the upper space 27A to the side of the bottom space 28A through a gap between adjacent fins 18 and 18. At this time, the gas comes into contact with the outer surfaces of the cooling tubes 17 and the fins 18 within the cooling unit 13A, so that the gas is cooled by heat exchange with the cooling water inside the cooling tubes 17. Moisture contained in the cooled gas is condensed into liquid droplets, which flow through the cooling tubes 17 and the fins 18 and fall down to the bottom wall 4. The gas flowing through the gap between the fins 18 and 18 promotes the falling of the liquid droplets attached to the cooling tubes 17 and the fins 18. The liquid droplets that have fallen down to the bottom wall 4 become drain water.

In the bottom space 28A of the intercooler 2A, the drain water is present on the bottom wall 4. However, the drain scattering prevention member 41A is laid on the bottom wall 4, thereby making it possible to suppress the drain water on the bottom wall 4 from being blown up and scattered by the gas flow blown on the bottom wall 4, while allowing the gas flow. Specifically, since the drain water is collected by the drain scattering prevention member 41A, scattering of the drain water can be suppressed when the gas flow is blown on the bottom wall 4. Consequently, the drain water can be effectively prevented or suppressed from flowing out of the lead-out port 33A to the outside of the intercooler 2A, accompanied by the gas flow. Furthermore, since the drain scattering prevention member 41A is provided to cover the lead-out port 33A, the drain water can be collected by the drain scattering prevention member 41A even if the drain water is about to pass through the lead-out port 33A, accompanied by the gas flow. Consequently, the drain water can be suppressed from flowing out of the lead-out port 33 to the outside of the intercooler 2A, accompanied by the gas flow. The provision of the drain scattering prevention member 41A can prevent the scattering of the drain water due to the gas flow and can also effectively suppress or prevent the outflow of the drain water to the outside, even when the flow rate of the compressed gas led into the intercooler 2A increases, making the flow speed thereof higher.

The gas discharged from the discharge port of the high-stage compressor is led from the lead-in ports 31B and 31B into the upper space 27B of the aftercooler 2B via the inlet port 32B. The gas spreads in the longitudinal direction within the upper space 27A and passes through the cooling unit 13B from its upper side to its lower side. The gas that has passed through the cooling unit 13B and flowed into the bottom space 28B flows out of the lead-out port 33B and is sent to the downstream side via an outlet port 35B. In this way, in the aftercooler 2B, the gas is introduced from the upper space 27B, i.e., from the upper side, and is then guided out of the bottom space 28B, that is, from the lower side. The moisture contained in the gas is condensed by cooling of the cooling unit 13B into liquid droplets, which then fall down on the bottom wall 4 and become drain water.

In the bottom space 28B of the aftercooler 2B, the drain water is present on the bottom wall 4. However, the drain scattering prevention member 41B is laid on the bottom wall 4, thereby making it possible to suppress the drain water on the bottom wall 4 from being blown up and scattered by the gas flow blown on the bottom wall 4, while allowing the gas flow. Specifically, since the drain water is collected by the drain scattering prevention member 41A, scattering of the drain water can be suppressed when the gas flow is blown on the bottom wall 4. Consequently, the drain water can be effectively prevented or suppressed from flowing out of the lead-out port 33B to the outside of the aftercooler 2B, accompanied by the gas flow. Furthermore, since the drain scattering prevention member 41B is provided to cover the lead-out port 33B, the drain water can be collected by the drain scattering prevention member 41B even if the drain water is about to pass through the lead-out port 33B, accompanied by the gas flow. Consequently, the drain water can be suppressed from flowing out of the lead-out port 33 to the outside of the intercooler 2A, accompanied by the gas flow. The provision of the drain scattering prevention member 41B can prevent the scattering of the drain water due to the gas flow and thereby can effectively suppress or prevent the outflow of the drain water to the outside, even when the flow rate of the compressed gas led into the aftercooler 2B increases, making the flow speed thereof higher.

As mentioned above, each of the drain scattering prevention members 41A and 41B in the present embodiment is a block body made of stainless steel wool. The stainless steel wool has, for example, a wire diameter of 0.25 mm or more and a space ratio of 94% or more and 99% or less. The term "space ratio" as used herein is a ratio of the volume of the space or gap to the volume of the stainless steel wool. When the wire diameter is less than 0.25 mm, the wires tend to wear and fall off when the wires rub against each other due to vibrations caused by pulsation of the compressed gas. If the space ratio is more than 99%, the collecting effect is reduced. If the space ratio is less than 94%, the specific power of the compressor is deteriorated due to pressure loss.

Modified examples of the present embodiment will be described below.

In the case of applying the drain scattering prevention member to a multi-stage compressor that includes the intercooler 2A and the aftercooler 2B, like the present embodiment, only the drain scattering prevention member 41B may be provided only in the aftercooler 2B. That is, in the present embodiment, the drain scattering prevention member 41A provided in the intercooler 2A may be eliminated.

Figure 7:
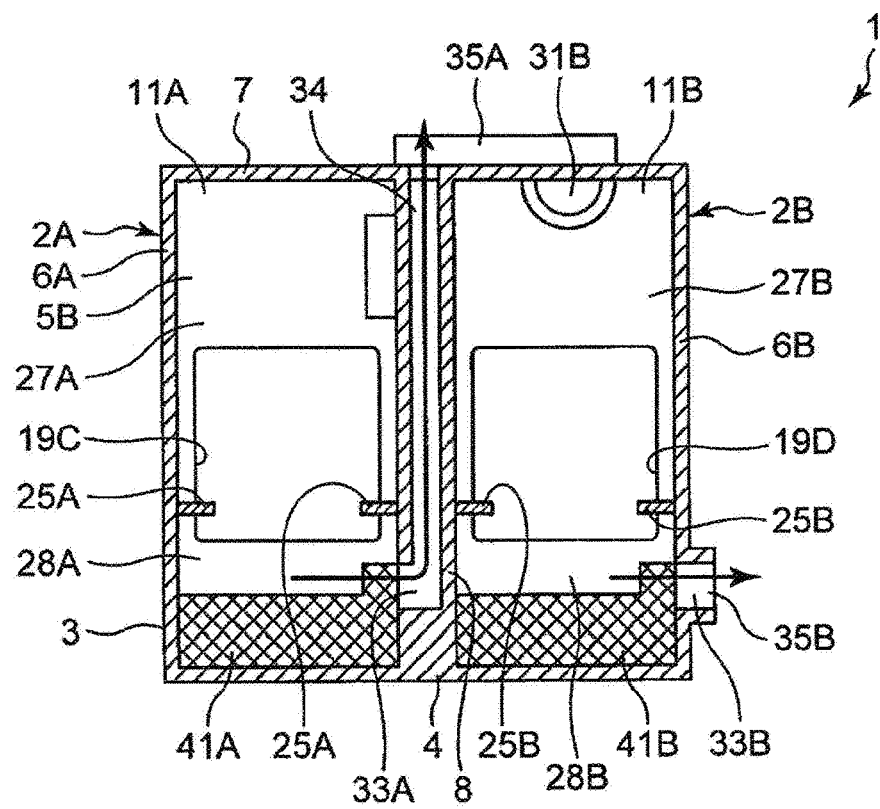
FIG. 7 is a schematic cross-sectional view, similar to FIG. 4, of a gas cooler according to a modified example.

In a modified example shown in FIG. 7, the heights of the drain scattering prevention members 41A and 41B are set higher than the heights of the upper ends of the lead-out ports 33A and 33B in the vicinities of the lead-out ports 33A and 33B, but in other parts, the heights of the drain scattering prevention members 41A and 41B are set lower than the heights of the lower ends of the lead-out ports 33A and 33B.

Figure 8:
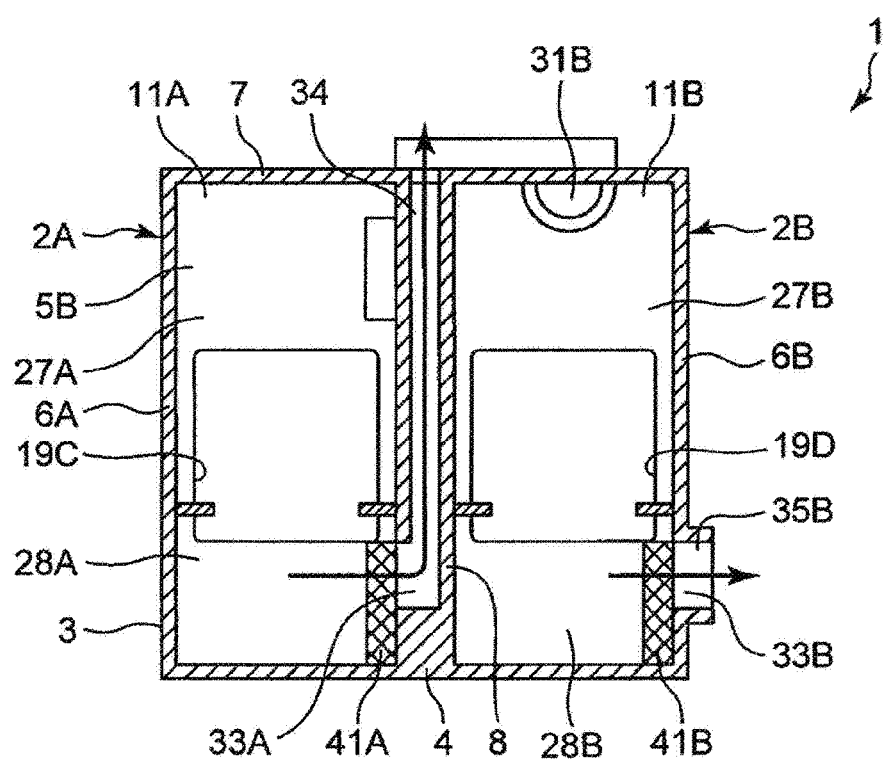
FIG. 8 is a schematic plan view, similar to FIG. 4, of a gas cooler according to another modified example.

In a modified example shown in FIG. 8, the widths of the drain scattering prevention members 41A and 41B are set sufficiently narrower than the widths of the first space 11A and the second space 11BB, respectively. The drain scattering prevention members 41A and 41B are not disposed on the bottom wall 4 in either of the intercooler 2A or the aftercooler 2B except for the vicinities of the lead-out ports 33A and 33B. The drain scattering prevention members 41A and 41B are provided to cover the lead-out ports 33A and 33B. In other words, the drain scattering prevention members 41A and 41B can collect drain water even if the drain water is scattered by the gas flow blown on the bottom wall 4 and is about to pass through the lead-out ports 33A and 33B, accompanied by the gas flow. Consequently, the drain water can be suppressed from flowing out of the lead-out ports 33A and 33B to the outside, accompanied by the gas flow.

While, in the present embodiment, the drain scattering prevention members 41A and 41B are laid to be in contact with the bottom of the casing 3, the drain scattering prevention members 41A and 41B may be laid while having a gap with respect to the bottom wall 4 of the casing 3. For example, a gap formation portion can be provided between the bottom wall 4 and each of the drain scattering prevention members 41A and 41B. The gap formation portion may be a convex portion formed at the bottom portion 4, a spacer provided as a separate body from the casing, or a convex portion provided in each of the drain scattering prevention members 41A and 41B. The gap is provided between the bottom wall 4 and each of the drain scattering prevention members 41A and 41B, so that the drain retained at the bottom portion 4 of the casing can be more likely to flow toward the drain discharge port.

The invention claimed is:

1. A gas cooler comprising:
a casing;
a cooling unit (13A) provided within the casing (3), wherein the cooling unit is fluidly connected to an inflow port (23A) and an outflow port (24B) such that cooling water is supplied from the inflow port (23A), passes through the cooling unit (13A) and flows out from the outflow port (24B) to cool gas;
an upper space located above the cooling unit and a bottom space located below the cooling unit, the upper space and the bottom space being formed separately from each other by the cooling unit within the casing;
a lead-in port for leading the gas into the upper space;
a lead-out port, provided in the bottom space, for leading out the gas from the bottom space;
a drain scattering prevention member disposed in the bottom space and being configured to collect therein drain water accompanied by the gas as the gas passes, the drain water being produced by condensation of moisture contained in the gas by cooling with the cooling unit; and
a drain discharge port for discharging the drain water to an outside of the casing, wherein
the drain scattering prevention member is provided to cover the lead-out port;
the cooling unit extends between opposing end walls of the casing, and a seal portion extends between the opposing end walls and engages the casing and the cooling unit to partition the upper space and the bottom space; and
the gas flows through the upper space, then passes through the cooling unit, and then flows through the bottom space.

2. The gas cooler according to claim 1, wherein the cooling unit includes a seal plate for sealing a space between the upper space and the bottom space.

3. The gas cooler according to claim 2, wherein the drain scattering prevention member is a block body made of metal wool.

4. The gas cooler according to claim 2, wherein the drain scattering prevention member is a stacked body of metal meshes.

5. The gas cooler according to claim 1, wherein the drain scattering prevention member is laid at a bottom wall of the casing.

6. The gas cooler according to claim 5, wherein the drain scattering prevention member is a block body made of metal wool.

7. The gas cooler according to claim 5, wherein the drain scattering prevention member is a stacked body of metal meshes.

8. The gas cooler according to claim 1 wherein the drain scattering prevention member is a block body made of metal wool.

9. The gas cooler according to claim 1, wherein the drain scattering prevention member is a stacked body of metal meshes.

10. A gas cooler comprising:
a casing;
a cooling unit (13A) provided within the casing (3), wherein the cooling unit is fluidly connected to an inflow port (23A) and an outflow port (24B) such that cooling water is supplied from the inflow port (23A), passes through the cooling unit (13A) and flows out from the outflow port (24B) to cool gas;
an upper space located above the cooling unit and a bottom space located below the cooling unit, the upper space and the bottom space being formed separately from each other by the cooling unit within the casing;
a lead-in port for leading the gas into the upper space;
a lead-out port, provided in the bottom space, for leading out the gas from the bottom space; and
a drain scattering prevention member disposed in the bottom space to cover the lead-out port and being configured to collect therein drain water accompanied by the gas as the gas passes, the drain water being produced by condensation of moisture contained in the gas by cooling with the cooling unit; and
a discharge port for discharging the drain water from the bottom space to an outside of the casing, wherein
the lead-out port is arranged on an upper side with respect to the discharge port,
the drain scattering prevention member is arranged on a bottom wall of the casing such as to prevent the drain water from being blown up to be scattered by a gas flow blown toward a bottom wall of the casing;

the cooling unit extends between opposing end walls of the casing, and a seal portion extends between the opposing end walls and engages the casing and the cooling unit to partition the upper space and the bottom space; and the gas flows through the upper space, then passes through the cooling unit, and then flows through the bottom space.

* * * * *